US009394111B2

(12) United States Patent
Caris et al.

(10) Patent No.: US 9,394,111 B2
(45) Date of Patent: Jul. 19, 2016

(54) FOOD CONVEYOR WITH REMOVABLE RETAINING WALLS

(71) Applicant: Dynamic Conveyor Corporation, Muskegon, MI (US)

(72) Inventors: Justin P. Caris, Norton Shores, MI (US); Paul A. Kuharevicz, Muskegon, MI (US)

(73) Assignee: Dynamic Conveyor Corporation, Muskegon, MI (US)

( * ) Notice: Subject to any disclaimer, the term of this patent is extended or adjusted under 35 U.S.C. 154(b) by 0 days.

(21) Appl. No.: 14/658,496

(22) Filed: Mar. 16, 2015

(65) Prior Publication Data

US 2015/0375940 A1    Dec. 31, 2015

Related U.S. Application Data

(60) Provisional application No. 62/018,120, filed on Jun. 27, 2014.

(51) Int. Cl.
| B65G 47/00 | (2006.01) |
| B65G 15/62 | (2006.01) |
| B65G 39/12 | (2006.01) |
| B65G 15/28 | (2006.01) |
| B65G 21/20 | (2006.01) |
| B65G 15/42 | (2006.01) |

(52) U.S. Cl.
CPC .............. *B65G 15/62* (2013.01); *B65G 15/28* (2013.01); *B65G 15/42* (2013.01); *B65G 21/2072* (2013.01); *B65G 39/12* (2013.01)

(58) Field of Classification Search
CPC ........ B65G 15/60; B65G 15/62; B65G 21/16; B65G 21/2045; B65G 21/2063; B65G 21/2072; B65G 21/2081

USPC ........ 198/836.1–836.4, 837, 842, 843, 861.2, 198/861.3

See application file for complete search history.

(56) References Cited

U.S. PATENT DOCUMENTS

| 448,857 | A | * | 3/1891 | Harrison | ................ | B65G 23/00 198/861.3 |
| 809,373 | A | * | 1/1906 | Hof et al. | ............. | B65G 41/002 198/311 |
| 3,491,873 | A | | 1/1970 | Fauth | | |
| 3,572,496 | A | * | 3/1971 | Cutts | ...................... | B65G 21/14 198/837 |
| 5,082,108 | A | | 1/1992 | Douglas | | |
| 5,875,883 | A | * | 3/1999 | Ertel | ...................... | B65G 15/42 198/821 |
| 6,053,307 | A | * | 4/2000 | Honda | ................... | B65G 15/46 198/839 |
| 6,196,375 | B1 | | 3/2001 | Cozza | | |
| 6,269,943 | B1 | | 8/2001 | Mott | | |
| 6,427,831 | B1 | | 8/2002 | Norton | | |

(Continued)

*Primary Examiner* — William R Harp

(74) *Attorney, Agent, or Firm* — Price Heneveld LLP

(57) ABSTRACT

A belt conveyor apparatus includes a conveyor frame with a belt support, a belt, a belt drive, and corner containment sidewalls releasably attached to the conveyor frame at a concave corner defined by the conveyor. The corner containment sidewalls each include a disk-shaped recess on an outboard surface at their lower/rearward edges, and corner rollers are rotatably mounted in the recesses, with an edge of each roller extending beyond the recess to engage and hold down the conveyor belt as the belt traverses the concave corner. The corner rollers greatly reduce sliding friction of the belt across the concave corner, and yet do not include lubricant, nor separate fasteners, nor create nib points. Thus, the rollers greatly facilitate maintenance, and reduce maintenance and component cost.

8 Claims, 4 Drawing Sheets

(56) References Cited

U.S. PATENT DOCUMENTS

| | | |
|---|---|---|
| 6,666,325 B1 | 12/2003 | Buenning et al. |
| 6,830,146 B1 | 12/2004 | Scully et al. |
| 7,673,741 B2 | 3/2010 | Nemedi |
| 7,789,220 B2 | 9/2010 | Bell et al. |
| 7,997,405 B2 | 8/2011 | Karpy |
| 8,746,443 B2 | 6/2014 | Araya Arancibia et al. |
| 2002/0139643 A1* | 10/2002 | Peltier .................. B65G 15/08 198/821 |

\* cited by examiner

US 9,394,111 B2

FOOD CONVEYOR WITH REMOVABLE RETAINING WALLS

This application claims benefit under 35 USC §119(e) of U.S. Provisional Application Ser. No. 62/018,120, filed Jun. 27, 2014, entitled CONVEYOR CONTAINMENT DEVICE WITH SIDEWALL-MOUNTED DYNAMIC ROLLER, the entire contents of which are incorporated herein by reference.

BACKGROUND OF THE INVENTION

The present invention relates to conveyors with belt containment devices, and more particularly to a conveyor having a belt containment device with sidewall-mounted dynamic roller that assists in movement of a conveyor belt around concave corners, but where the dynamic roller is positioned to avoid an exposed nib point that will crush food on the belt, and where the roller is releasably attached for quick removal without the use of separate fasteners, such that it is well suited for environments and industries requiring cleanliness and sterility.

Belt conveyors with containment side members are often used to convey food. The containment side members hold food items on the belt, but are made removable for cleaning and sterilization purposes. Sometimes, the containment side members (also called "sidewalls" or "retaining walls" herein) are also used to prevent a conveyor belt from lifting off an underlying belt support, such as when the belt is tensioned across a concave transition zone leading from a horizontal lower section to an inclined elevating section of the conveyor.

It is desirable to hold down the conveyor belt across concave transition zones without using rollers with lubricated bearings, since such bearings are expensive, require maintenance, are attached using fasteners that may come loose, and require lubrication. Notably, lubrication, if leaked, can dis-flavor and/or contaminate food product. Also, rollers with lubricated bearings may include crevices and difficult-to-clean areas potentially harboring germs and/or bacteria, such that they are difficult to sanitize. Further, fasteners can become loose and can fall into the food product, which is a major concern. Also, fasteners require time to remove for maintenance and, once removed, can get lost.

Another problem is the position of the hold-down device on the conveyor belt. If the hold-down device extends inside the sidewall, the hold-down device will form a nib point with the conveyor belt, where it will crush and damage food traveling adjacent the sidewall. Nib points can also be a source of worker injury.

An improvement is desired for attachment of containment side members that is simple, does not form an exposed nib point, does not include separate fasteners nor threaded fasteners, is easily cleaned and sterilized, and is less manually intensive to remove and reattach.

SUMMARY OF THE PRESENT INVENTION

In one aspect of the present invention, an improvement is provided for a belt conveyor apparatus including a conveyor frame including a belt support, a belt, a belt drive, and a corner containment sidewall on each side of the conveyor releasably attached to the conveyor frame on a concave corner defined by the conveyor. The improvement comprises a roller (sometimes called a "dynamic roller" herein) engaging an outboard side of each corner containment sidewall, the roller having a conveyor-engaging roller edge that extends slightly beyond the corner containment sidewall to rollingly engage and hold down the belt as the belt moves across the concave corner.

In a narrower aspect of the present invention, the corner containment sidewall includes a disk-shaped recess in the outboard side that receives and rotationally supports the dynamic roller.

In a narrower aspect of the present invention, the corner containment sidewall includes an axle-receiving recess, and wherein the roller includes an axle stub engaging the axle-receiving recess.

In another aspect of the present invention, a belt conveyor apparatus includes a conveyor frame including a belt support, a belt, a belt drive, and a corner containment sidewall on each side of the conveyor releasably attached to the conveyor frame on a concave corner defined by the conveyor. A roller engages an outboard side of each corner containment sidewall, the roller having a conveyor-engaging roller edge that extends slightly beyond the corner containment sidewall to rollingly engage and hold down the belt as the belt moves across the concave corner.

In another aspect of the present invention, a method comprises providing a conveyor frame including a belt support, a belt, a belt drive, and a corner containment sidewall on each side of the conveyor releasably attached to the conveyor frame on a concave corner defined by the conveyor; placing a roller on and engaging an outboard side of each corner containment sidewall at the concave corner, the roller having a conveyor-engaging roller edge that extends slightly beyond the corner containment sidewall; and rollingly engaging and holding down the belt with the roller as the belt moves across the concave corner.

An object of the present invention is to provide a conveyor apparatus with conveyor belt, sidewalls, and a hold down device that allows for conveyor belt inclination changes/corners, yet allows quick disassembly and reassembly without the need for separate loose fasteners.

An object of the present invention is to provide an arrangement permitting disassembly and reassembly that is tool-less, fastener-less, and that can be done quickly. Specifically, because the containment side member can be taken out of or reinstalled into the conveyor effortlessly and quickly, it significantly reduces the cost of ownership for conveyor(s) that need daily cleaning.

An object of the present invention is to provide an arrangement that facilitates moving a conveyor belt around a concave corner, but that prevents product damage from nib points (i.e. "cookie crush"), improves safety for workers by eliminating nib points, provides tool-less and fastenerless removal, that does not require lubrication, and that is particularly adapted for handling food and pharmaceuticals and products requiring a high level of sanitation and cleanliness.

These and other aspects, objects, and features of the present invention will be understood and appreciated by those skilled in the art upon studying the following specification, claims, and appended drawings.

BRIEF DESCRIPTION OF THE DRAWINGS

FIG. 5 is an enlargement of FIG. 4 to better show the roller.

DETAILED DESCRIPTION OF PREFERRED EMBODIMENTS

Figure 1:
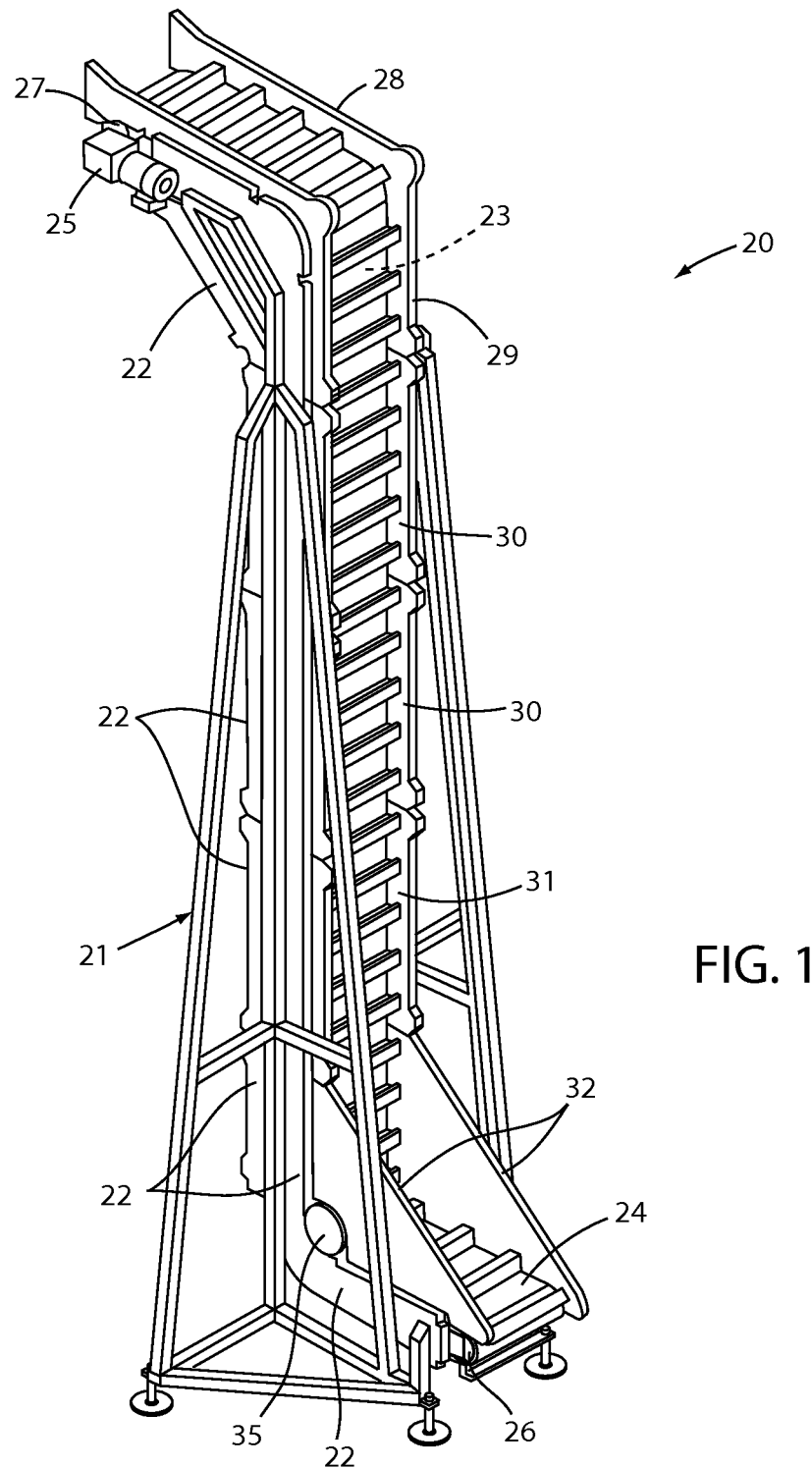
FIG. 1 is a perspective view of a conveyor embodying the present invention.
Figure 2:
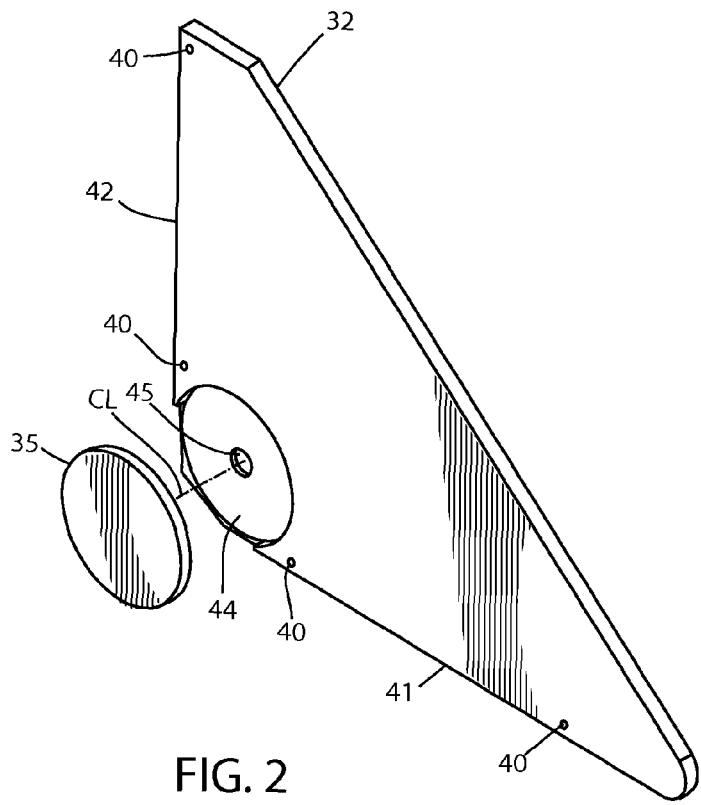
FIGS. 2-3 are exploded and assembled perspective views of the corner containment sidewall illustrated in FIG. 1, FIG. 2 showing the corner roller exploded away and showing the disk-shaped recess and axle-receiving recess for receiving the roller, FIG. 3 showing the roller positioned in the disk-shaped recess in the outer side of the triangular corner containment sidewall.
Figure 3:
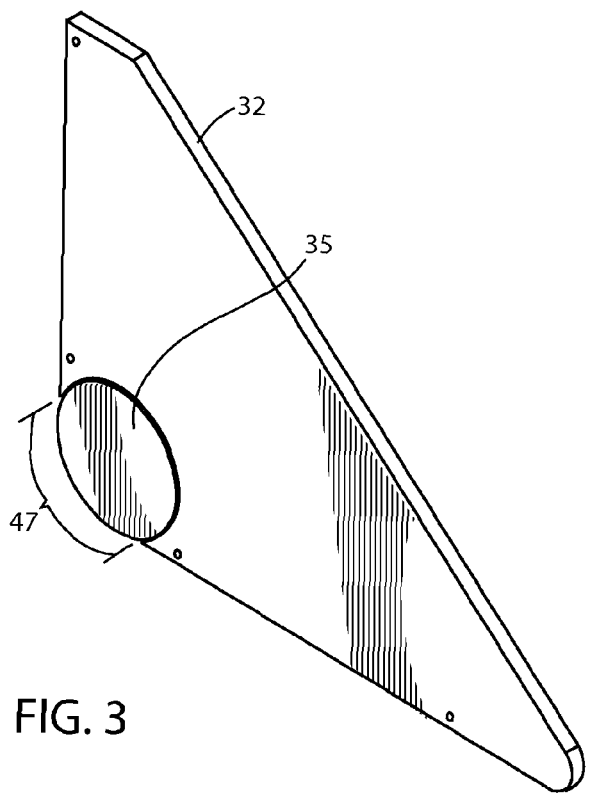
Figure 4:
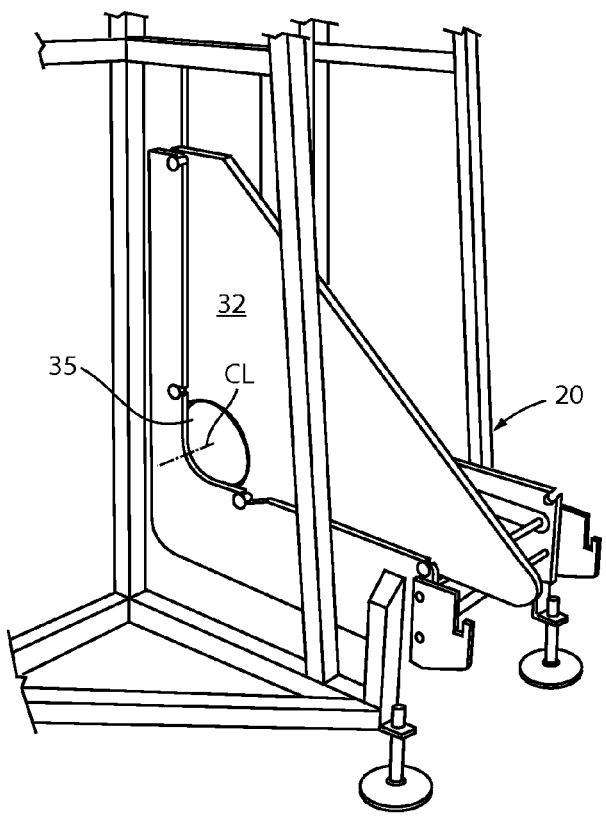
FIGS. 4-5 are partial assembly perspective views of FIG. 1, FIG. 4 showing a corner containment sidewall and corner roller installed on a conveyor frame with other parts removed to better show a relationship of the sidewall to the belt-supporting framework.
Figure 5:
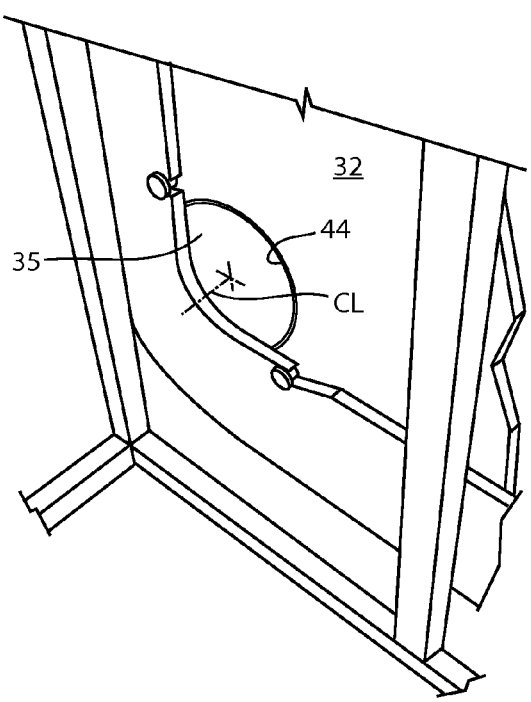
Figure 6:
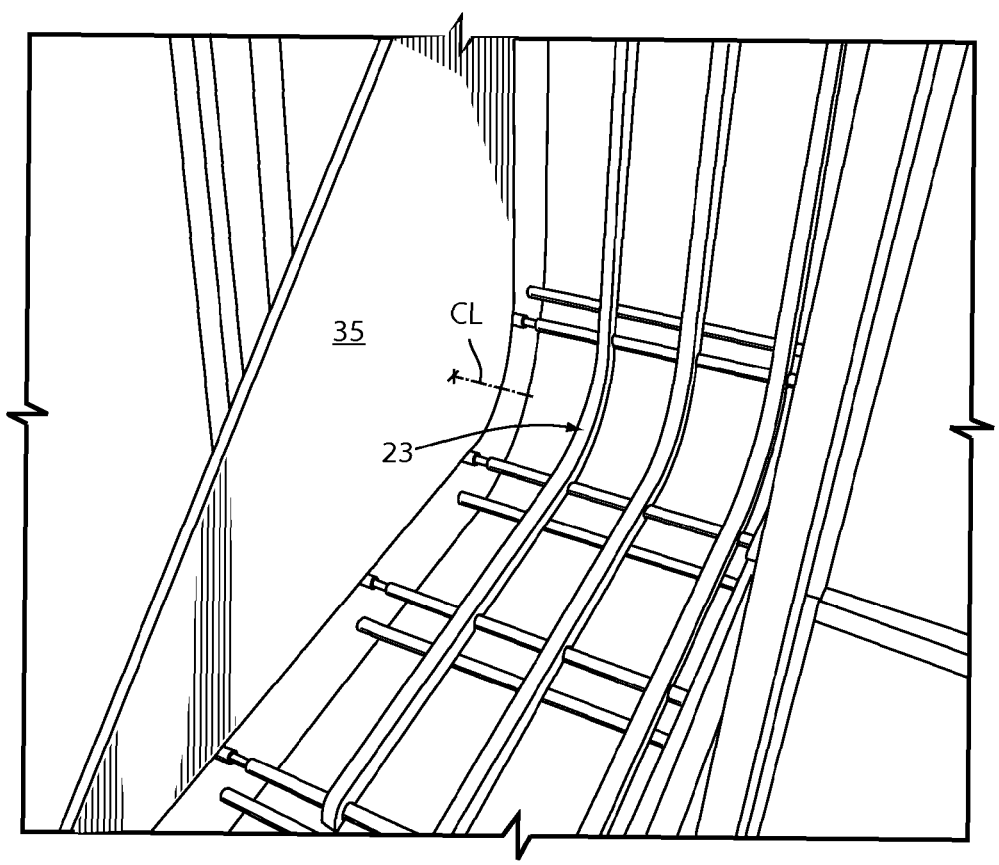
FIG. 6 is a partial assembly perspective view of FIG. 4, but showing an inboard side of the corner containment sidewall installed on a conveyor frame (the corner roller being hidden by the sidewall), the conveyor belt removed to show underlying supporting components.

The present belt conveyor 20 (FIG. 1) includes a conveyor frame 21 with side frame panel members 22, belt support 23, a belt 24, a belt control and drive 25, end roller 26 and driving roller 27. Multiple containment sidewalls 28-32 are releasably attached inside the side frame panel members 22 of the conveyor frame 21. The illustrated conveyor 20 is Z-shaped, and includes a lower horizontal section, a vertical section (slightly angled), and an elevated upper horizontal section. The illustrated lowermost sidewall 32 (also called a "corner containment sidewall") on each side is triangularly shaped, and extends around the concave corner formed by the lower horizontal section and a lower part of the vertical section. When the belt 24 is tensioned, it causes an upward bias on the containment sidewall 32. However, mounted to an outboard side of the containment sidewall 32 is a dynamic roller 35 that rollingly engages the belt 24 to hold the belt 24 against the concave corner of the conveyor 30.

It is noted that the present containment sidewalls 28-32 are made from ultra-high-molecular-weight polyethylene (UHMW PE) or similar lubricious material suitable for use in a food or pharmaceutical conveyor, and capable of use in a clean and sterile environment. The UHMW PE material provides a solid, low wear, bearing surface that has a low coefficient of sliding friction (between the moving conveyor belt and the device), and yet is structural, as discussed below. The containment sidewalls 28-32 are mounted to respective side frame panel members 22 in ways known in the art, such that a detailed description is not required for an understanding by persons skilled in this art.

Corner containment sidewall 32 is triangular, and includes holes 40 for attachment fasteners along its lower horizontal edge 41 and rear vertical edge 42. A forward end of the sidewall 32 may include a finger extending to (and potentially partially around) the front/end roller 26 of the conveyor 30. The corner defined between edges 41 and 42 includes a disk-shaped recess 44 and a concentric smaller axle-receiving recess 45 defining a centerline of rotation CL. About 245 to 270 degrees (or more preferably about 260 degrees of the disk-shaped recess 44 is bounded by material of the containment sidewall 32, with a remainder of the recess 44 being open (i.e. open slightly more than 90 degrees) and facing toward a rear/down side of the containment sidewall 32. It is contemplated that the recesses 44 and 45 can be different sizes depending on the requirements of a particular conveyor 30. For illustrative purposes, the disclosed conveyor 30 is about 12-14 feet tall vertically, and the disk-shaped recess 44 is about 9 inches diameter and ½ inch deep, and the axle-receiving recess 45 is about 1½ inch diameter and ½" deep. The recess 56 is not a through hole, so that it does not interrupt a continuous surface on the inboard side of the retaining wall 32.

A dynamic roller 35 made of UHMW PE or similar lubricious material suitable for use in a food or pharmaceutical conveyor is provided on each side. The roller 35 is disk-shaped and shaped to fit with small clearance into the disk-shaped recess 44. The roller 35 includes an axle stub 48 shaped to fit with small clearance into the axle-receiving recess 45. When roller 35 is positioned in the recesses 44/45 of sidewall 32, it is slightly below flush with the outer surface of the sidewall 32, and a portion 47 of the outer edge of the roller 35 extends beyond the sidewall 32 into contact with the conveyor belt 24 to hold down the belt 24 as the belt 24 extends around the conveyor corner. The dynamic rollers 35 greatly reduce the sliding friction to move the conveyor belt 24 across the concave corner, thus reducing wear and reducing the amount of horse power needed to operate the conveyor 30. Since the rollers 35 are on the outboard side of the sidewall 32, the arrangement eliminates nib points. Thus, it minimizes damage to food on the conveyor and eliminates a nib point and hence possible injury site for maintenance workers.

This arrangement results in elimination of several quality and warranty problems, including potential food contamination from lubrication and/or loose fasteners and/or fasteners that fall off assembled conveyors. Also, it eliminates exposed threads and inherent crevices and difficult-to-clean areas in the present conveyor. Further, assembly and disassembly time is greatly reduced. Further, the components are simple, few in number, and easily cleaned and sterilized. The present conveyor is believed to be particularly useful in conveyor systems for food and pharmaceutical environments, and anywhere that sanitation, cleanliness, and/or an ability to quickly disassemble and reassemble is desired, especially where there is a desire or reason to minimize the use of separate fasteners.

It is to be understood that variations and modifications can be made on the aforementioned structure without departing from the concepts of the present invention, and further it is to be understood that such concepts are intended to be covered by the following claims unless these claims by their language expressly state otherwise.

The embodiments of the invention in which an exclusive property or privilege is claimed are defined as follows:

1. In a belt conveyor apparatus including a conveyor frame including a belt support, a belt, a belt drive, and a corner containment sidewall on each side of the conveyor frame and releasably attached to the conveyor frame on a concave corner defined by the conveyor, an improvement comprising:
   a roller engaging an outboard side of each corner containment sidewall, the roller having a conveyor-engaging roller edge that extends slightly beyond the corner containment sidewall to rollingly engage and hold down the belt as the belt moves across the concave corner; wherein the corner containment sidewall includes a disk-shaped recess in the outboard side that receives and rotationally supports the associated roller.

2. The improvement defined in claim 1, wherein the corner containment sidewall includes an axle-receiving recess, and wherein the roller includes an axle stub engaging the axle-receiving recess.

3. A belt conveyor apparatus comprising:
   a conveyor frame including a belt support, a belt, a belt drive, and a corner containment sidewall on each side of the conveyor frame and releasably attached to the conveyor frame on a concave corner defined by the conveyor; and
   a roller engaging an outboard side of each corner containment sidewall, the roller having a conveyor-engaging roller edge that extends slightly beyond the corner containment sidewall to rollingly engage and hold down the belt as the belt moves across the concave corner; wherein each of the corner containment sidewalls includes a disk-shaped recess in the outboard side that receives and rotationally supports the associated roller.

4. The belt conveyor apparatus defined in claim 3, wherein the corner containment sidewall includes an axle-receiving recess, and wherein the roller includes an axle stub engaging the axle-receiving recess.

5. A belt conveyor apparatus comprising:
a conveyor frame including a belt support, a belt, a belt drive and sidewalls; the conveyor frame defining a concave corner; and
free-wheeling rollers on each side of at the concave corner that rollingly engage the belt as the belt moves across the concave corner; wherein the free-wheeling rollers are positioned adjacent associated ones of the sidewalls; wherein the free-wheeling rollers are positioned in a disk-shaped recess in the associated sidewalls.

6. The belt conveyor apparatus in claim 5, wherein the free-wheeling rollers each include an axle stub rotatably engaging a mating axle-receiving recess in the associated sidewalls.

7. The belt conveyor apparatus in claim 5, wherein the sidewalls define containment for articles carried on the conveyor belt.

8. A method comprising:
providing a conveyor frame including a belt support, a belt, a belt drive, and a corner containment sidewall on each side of the conveyor frame and releasably attached to the conveyor frame on a concave corner defined by the conveyor; the corner containment sidewalls each including a disk-shaped recess in an outboard side;

placing a roller in the disk-shaped recess in the outboard side of each corner containment sidewall at the concave corner, the roller having a conveyor-engaging roller edge that extends slightly beyond the corner containment sidewall; and rollingly engaging and holding down the belt with the roller as the belt moves across the concave corner.

* * * * *